(12) United States Patent
Gupta

(10) Patent No.: US 10,339,101 B1
(45) Date of Patent: Jul. 2, 2019

(54) DISTRIBUTED WRITE JOURNALS THAT SUPPORT FAST SNAPSHOTTING FOR A DISTRIBUTED FILE SYSTEM

(71) Applicant: Cohesity, Inc., Santa Clara, CA (US)

(72) Inventor: Apurv Gupta, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 491 days.

(21) Appl. No.: 14/852,332

(22) Filed: Sep. 11, 2015

(51) Int. Cl.
| | | |
|---|---|---|
| *G06F 17/00* | (2019.01) | |
| *G06F 7/00* | (2006.01) | |
| *G06F 16/11* | (2019.01) | |

(52) U.S. Cl.
CPC .................. *G06F 16/128* (2019.01)

(58) Field of Classification Search
CPC ................................................ G06F 17/30088
USPC ......................................................... 707/639
See application file for complete search history.

(56) References Cited

U.S. PATENT DOCUMENTS

| | | | | |
|---|---|---|---|---|
| 6,385,707 B1 * | 5/2002 | Maffezzoni | ......... | G06F 11/1458 707/999.202 |
| 7,185,227 B2 * | 2/2007 | Eguchi | .................. | G06F 11/142 707/999.202 |
| 7,509,358 B1 * | 3/2009 | Bingham | ............ | G06F 11/1451 707/999.202 |
| 8,275,743 B1 * | 9/2012 | Dantkale | ............. | G06F 11/2058 707/610 |
| 9,317,423 B2 * | 4/2016 | Tatara | ..................... | G06F 3/061 |
| 2006/0277384 A1 * | 12/2006 | Yagawa | .............. | G06F 11/3428 711/170 |
| 2007/0067586 A1 * | 3/2007 | Mikami | .............. | G06F 11/1471 711/162 |
| 2009/0013012 A1 * | 1/2009 | Ichikawa | ............ | G06F 11/1464 707/999.204 |
| 2009/0031083 A1 * | 1/2009 | Willis | .................. | G06F 11/1441 711/135 |
| 2009/0172417 A1 * | 7/2009 | Mikami | .............. | G06F 11/1471 713/193 |
| 2009/0240744 A1 * | 9/2009 | Thomson | ............ | G06F 16/2358 707/999.204 |
| 2014/0195722 A1 * | 7/2014 | Tatara | ..................... | G06F 3/061 711/103 |
| 2014/0201149 A1 * | 7/2014 | Wang | ................. | G06F 17/30174 707/639 |
| 2015/0193464 A1 * | 7/2015 | Kwon | ................. | G06F 16/1815 707/648 |
| 2016/0110268 A1 * | 4/2016 | Sekiguchi | ............. | G06F 12/023 714/15 |
| 2016/0371008 A1 * | 12/2016 | Inoue | ........................ | G06F 3/06 |

* cited by examiner

*Primary Examiner* — Pavan Mamillapalli
(74) *Attorney, Agent, or Firm* — Van Pelt, Yi & James LLP

(57) ABSTRACT

Embodiments presented herein disclose techniques for capturing a snapshot of a file system object (e.g., a file or a directory) that is associated with a write journal having outstanding data. A bridge process in a storage server receives a request to capture a snapshot of a file system object. The snapshot is a backup of a state of the file system object in a given point in time. Upon determining that the file system object has one or more outstanding updates recorded in a write journal, the bridge process generates a copy of the write journal. The bridge process captures the snapshot of the file system object. The bridge process also associates the copy of the write journal with the snapshot of the file system object.

21 Claims, 6 Drawing Sheets

DISTRIBUTED WRITE JOURNALS THAT SUPPORT FAST SNAPSHOTTING FOR A DISTRIBUTED FILE SYSTEM

BACKGROUND

Field

Embodiments presented herein generally relate to storage data I/O, and more particularly, to capturing a snapshot of a file system object (e.g., a file or a directory) associated with a write journal having outstanding data.

Description of the Related Art

Write journaling is a technique that many file systems use to improve I/O performance. When the file system receives a write request to a portion of a file system object (e.g., to modify a file, create a directory, delete a file, etc.), the file system writes to an in-memory journal, rather than directly to the disk location where the portion is located. Doing so allows the file system to perform write operations relatively quickly because the file system does not seek through the disk to identify where the portion is actually located. Instead, the file system writes to the journal sequentially, and at a later time, the file system flushes the journal data to the actual disk location.

Typically, before additional operations can be performed to a certain file (or other type of file system object) the write journals associated with the file need to be flushed to the actual locations on disk. For example, some file systems support snapshotting, where the file system creates a near-instantaneous backup (a "snapshot") of a state of an object at some point in time. The file system may create a snapshot of the entire system state or, more granularly, a state of a file system object. Generally, when the file system performs a snapshot operation on a file, the file system must ensure that no outstanding data remains in any write journal associated with that file. In such a case, the file system flushes the journal prior to performing the snapshot operation. In doing so, the file system maintains consistency between snapshots. However, the snapshot operation may consequently experience some delay while outstanding data in the write journal is flushed to disk.

SUMMARY

One embodiment presented herein describes a method for capturing a snapshot in a file system. The method generally includes receiving a request to capture a snapshot of a file system object. The snapshot is a backup of a state of the file system object in a given point of time. Upon determining that the file system object has one or more outstanding updates recorded in a write journal, a copy of the write journal is generated. The snapshot of the file system object is captured. The method also includes associating the copy of the write journal with the snapshot of the file system object.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
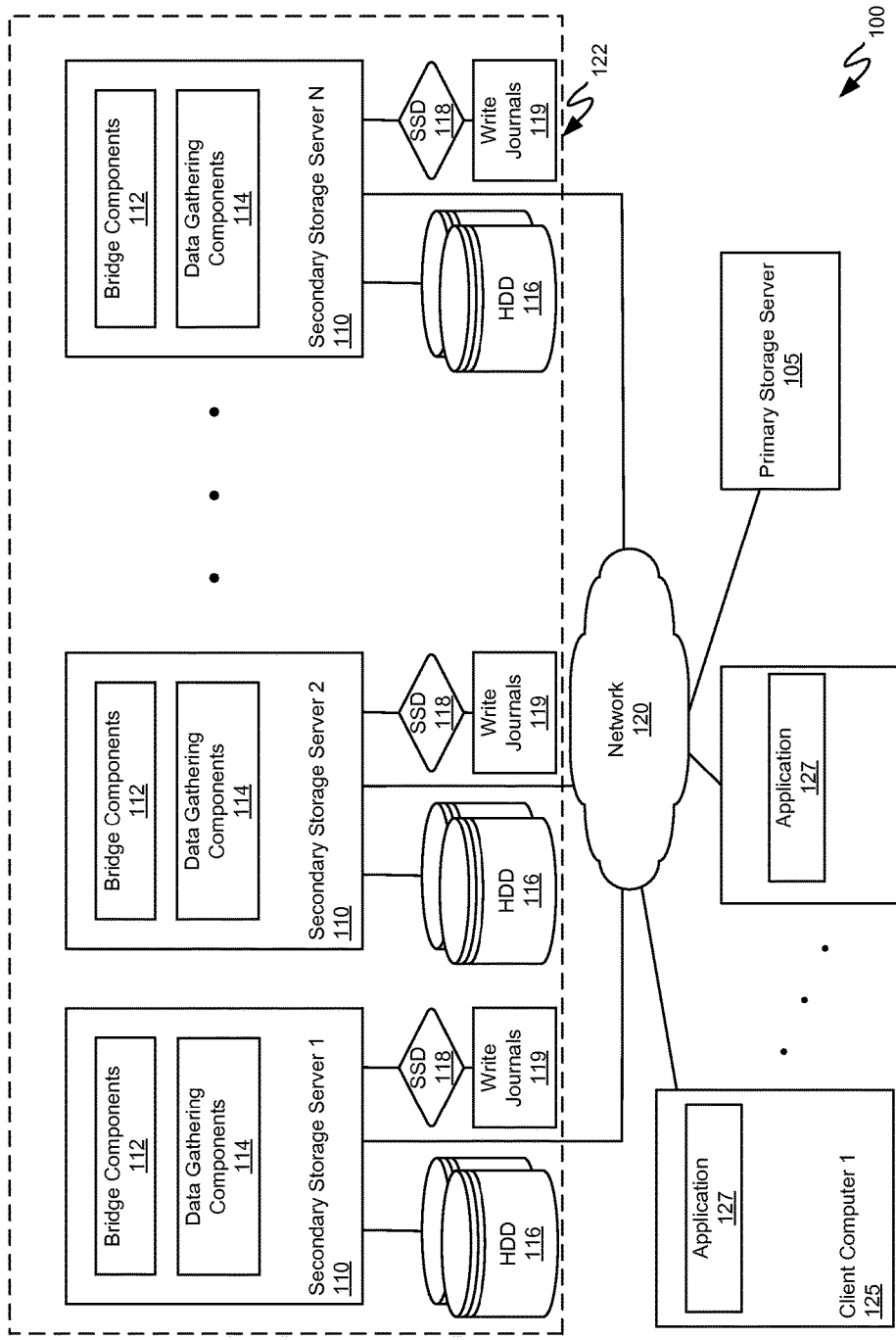
FIG. 1 illustrates an example computing environment, according to one embodiment.

Embodiments presented herein describe techniques for performing a snapshot operation on a file system object (e.g., a file or directory in the file system) associated with a write journal having outstanding data. A snapshot provides a backup of a file system state (or file system object state) at a given point of time.

For example, a distributed secondary storage system having multiple storage nodes in a cluster may distribute write journals across the storage nodes. Each write journal is a data structure persistently stored in the nodes. Further, each write journal may record data writes of a file system object or groups of file system objects (such as of files in a directory). A process executing in the background may later flush the changes to disk. As a result, the distributed write journal allows the distributed secondary storage system to write data to disk relatively quickly. Further still, the distributed secondary storage system allows clients to create snapshots of files, directories, and the entire file system. In one embodiment, a snapshot of a file in the distributed secondary storage system is a pointer that references the state of the file at a given point in time.

In one embodiment, when a cluster node in the distributed secondary storage system receives a request to create a snapshot of a given file (or file system object), the node determines whether any write journal in the system includes any outstanding data for the file. If so, the node creates a copy of the corresponding write journal (or journals) and includes the copy the journal with the created snapshot. That is, rather than flush the outstanding data of the write journal to the corresponding location on disk (and consume time and processing power as a result), instead, the node creates a "snapshot" of the write journal by copying the journal (and contents) and associating the copy with the file snapshot.

Later in time, a maintenance process executing in the background of the node flushes the write journal associated with the snapshot to disk. That is, the maintenance process applies the changes to current state of the file system.

Further, when the cluster node receives a request to create a snapshot of a given directory (or of the file system), the node evaluates files and sub-directories under the directory. The node does so to identify any associated write journals having outstanding data for the files and sub-directories. And if so, the node copies the write journals and associates the copies with the respective files and sub-directories that are part of the directory snapshot. The maintenance process identifies the write journals at a later time and flushes the write journal, applying the changes to disk. In one embodiment, the maintenance process may apply the same flush procedure to the directory snapshot as the procedure for the original directory.

Advantageously, embodiments presented herein describe techniques for creating a write journal snapshot to associate with snapshots of file system objects in a storage system. Rather than apply changes specified in a write journal to disk prior to snapshotting a file (or directory), the storage system copies the write journal and associates the write journal with the snapshotted file. Thus, if outstanding data for a file system object (whether the original object itself or a snapshot of that object) exists in a write journal, the outstanding data is written to disk at a later time. Because a background process routinely flushes write journals of the storage system, creating a physical copy of a journal having outstanding data does not affect performance. As a result, the storage system may capture file system object snapshots relatively quickly.

Note, the following uses a distributed secondary storage system as a reference example of a storage system that captures a snapshot of a file system object and associates the snapshot with copies of a write journal having outstanding changes to the file to be written to disk. However, one of skill in the art will appreciate that embodiments presented herein may be adapted to various file storage systems perform snapshot operations and maintain write journals on disk.

FIG. 1 illustrates an example computing environment 100, according to one embodiment. As shown, the computing environment includes a primary storage server 105 and a cluster 122. As shown, the cluster 122 includes multiple secondary storage servers 110 (as secondary storage servers 1-N 110) that host and manage a distributed service (e.g., secondary storage services). The primary storage server 105 and secondary storage servers 110 are each connected via a network 120. The primary storage server 105 and secondary storage servers 110 may provide storage for a data center.

In particular, the cluster 122 of secondary storage servers 110 form a distributed file system which provides backup storage and services to the primary storage server 105. Illustratively, each secondary storage server 110 (or "node") of the distributed file system includes bridge components 112 and data gathering components 114. The bridge components 112 may provide software applications that allow external clients to access each node. The data gathering components 114 are generally configured to retrieve data from primary storage server 105 (e.g., by communicating with the primary storage server 105 using a backup protocol). Further, each node includes one or more hard disk drives (HDDs) 116 and solid-state drives (SSDs) 118 for storing data from primary storage server 105. The SSDs 118 increase the performance running secondary storage transactions, such as serial-write transactions. In one embodiment, the distributed file system is the SnapFS® developed by Cohesity, Inc.

Further, each SSD 118 may maintain a number of distributed write journals 119. The write journals 119 are distributed across the multiple nodes of the cluster 122. The distribution allows outstanding writes and modifications to the distributed file system to continue uninterrupted, even in the event of one of the secondary storage servers 110 going offline, e.g., due to node failure, system maintenance, etc. Each journal maintains a record of changes to a given file system object on disk, such as a file or directory. A background process flushes each write journal 119 to the respective disk storage location, i.e., applies the changes to the file actually stored on disk. Each entry of a distributed write journals 119 may include sequence numbers and timestamps to maintain consistency among nodes of the cluster 122. Further, the write journals 119 can include metadata journals and data journals. Metadata journals include recorded changes related to the structure of the file system, e.g., file creation, file deletion, new directory, renames, etc. Data journals include recorded changes to the data of a file or directory.

In one embodiment, distributed cluster 122 may expose backup data to applications 127 on client computers 125 (as client computers 1-M 125). For example, assume the distributed cluster 122 provides a backup of a file system on the primary storage server 105. In such a case, the cluster 122 could create a snapshot of a file system on the primary storage server 105 every few minutes. Further, the cluster 122 could expose a clone of one of the snapshots to applications 127. For example, the cluster 122 could export a clone as an NFS mount point (or SMB, CIFS, etc.), allowing the client computers 125 to mount the snapshot over a directory in the local file system of the client computer 125. In such a case, the bridge components 112 may respond to requests from client computers 125 to perform NFS operations (or operations for SMB, CIFS, etc.) on the mounted directory (e.g., lookup, create, read, write, rename, remove, etc.).

Figure 2:
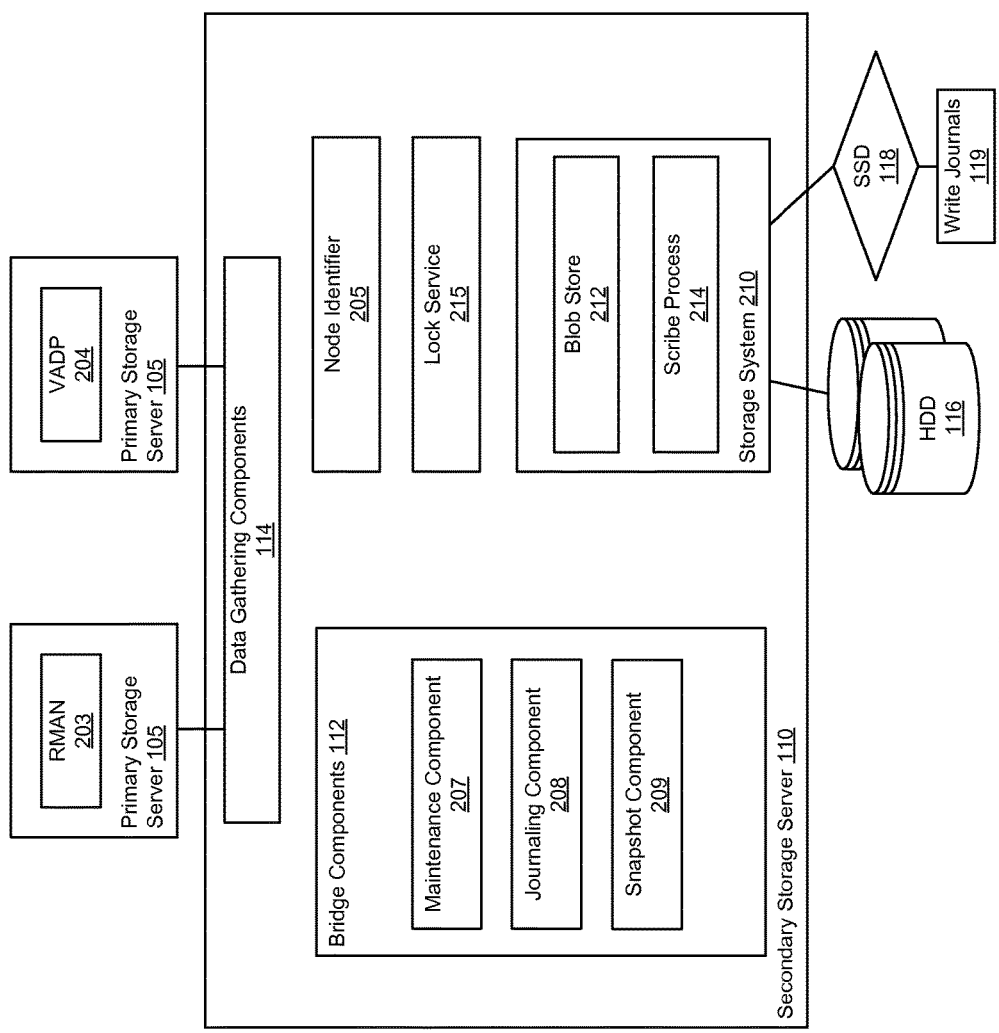
FIG. 2 illustrates an example of one of the secondary storage servers described relative to FIG. 1, according to one embodiment.

FIG. 2 further illustrates an example of one of the secondary storage servers 110, according to one embodiment. As shown, the secondary storage server 110 includes bridge components 112, data gathering components 114, a node identifier 205, a storage system 210, and a lock service 215. The node identifier 205 is a distinct value that may be based on the MAC address of the secondary storage server 110. The bridge component 112 further includes a maintenance component 207, a journaling component 208, and a snapshot component 209.

As stated, the data gathering components 114 communicate with primary storage servers in the computing environment 100. Illustratively, the data gathering components 114 may retrieve data from primary storage servers 201 and 202, where each primary storage server 201 and 202 execute backup protocols such as recovery manager (RMAN) 206 and vStorage APIs for Data Protection (VADP) 207.

The secondary storage server 110 includes a storage system 210. The storage system 210 itself includes a blob store 212 and a scribe process 214. The storage system 210, in conjunction with the storage systems of other secondary storage servers in the cluster, forms a distributed system used to store backup data from the primary storage services. Further, the secondary storage server 110 may create each backup with its own format according to a backup object. For example, assume the bridge components 112 receive a virtual machine disk (VMDK) from the data gathering components 114. In such a case, backup processes executing in the bridge components 112 write the VMDK to disk storage.

In addition, file system metadata is stored in SSD 118. However, as a VMDK file can be quite large (e.g., terabytes), bridge components 112 may store the VMDK file as set of smaller blobs (binary large object) files managed by a blob manager, each having a set of chunks (e.g., approximately 8 KB each). Backup data below a given size threshold (e.g., files less than 256K bytes) could be stored in the SSD 118 directly along with the file system metadata. Each blob is encoded according to a backup format of the secondary storage system.

Data in the secondary storage server 110 may be stored in distributed B+ trees or blob structures. In one embodiment, data smaller than 256 KB resides in distributed B+ trees, and data larger than 256 KB is stored in blob structures. The secondary storage server 200 may maintain a blob store 214 that contains the blob structures. Each blob may be divided into regions of a particular size, such as 1 MB. These regions, or "bricks," may further contain chunks of data that reference logical files in the SSD 118 and the HDDs 116.

In one embodiment, the scribe process 214 also maintains information about the chunks of data in the blob store 212 in key-value stores (e.g., tree structures). One example key-value store may map blob structures to brick sections. Another store may map bricks to chunks. Yet another store may map chunks to logical files storage drives of the secondary storage server 110. And another key-value store may map files and directories to a given distributed write journal 119.

In one embodiment, the lock service 215 is a distributed process that other components of the secondary storage server 110 may communicate with to obtain a lock on a given file system object. For example, prior to modifying a file, a process of the bridge components 112 may obtain, via the lock service 215, a lock on the file that prevents other processes (e.g., executing on another secondary storage server 110 in the cluster 122) from accessing the file. If the bridge process successfully obtains the lock, the bridge process can modify the file. The bridge process may subsequently release the lock for other processes to obtain.

In one embodiment, the journaling component 208 may add changes to a file or group of files to a journal 119 in the distributed file system. Further, the journaling component 208 may receive file system modification requests, such as a request to write to a file, a request to update a file (e.g., rename or delete the file), etc. The journaling component 208 records the updates, e.g., file writes, to an associate write journal 119. The journaling component 208 does so sequentially for a given write journal 119. Further, to preserve fault tolerance, the cluster 122 may maintain additional copies of a given journal 119 in other secondary storage servers 110.

In one embodiment, the maintenance component 207 performs a series of self-healing processes in the background of the secondary storage server 110. The maintenance component 207 may schedule flushing of a write journal 119 based on present resources and activity of the secondary storage server 110. Further, the maintenance component 207 also flushes the write journal 119 sequentially. Doing so allows the storage system 210 to preserve consistency throughout the secondary storage servers 110 in the cluster 122.

In one embodiment, the snapshot component 209 receives requests, e.g., from a client, to create a snapshot of the entire distributed file system of objects of the file system, such as files and directories. A snapshot is a backup of the state of the file system object at a given point in time. When the snapshot component 209 receives a request to snapshot a file, the snapshot component 209 creates a snapshot object that references, via a pointer, the requested file at that point in time. Further, later in time, the client may request to roll back a given file to the state reflected in the snapshot. In response, the snapshot component 209 may present the file in such a state.

Further, when the snapshot component 209 receives a request (e.g., from the client) to capture a snapshot of a file, the snapshot component 209 determines whether the file has any outstanding blocks of data (e.g., data or metadata changes to the file) in any associated journals 119 (including live copies of the journals 119 maintained for fault tolerance purposes) that the maintenance component 207 has not yet flushed to disk. As an example of how to do so, the snapshot component 209 may attempt to obtain a lock on the file from the lock service 215. An unsuccessful attempt indicates that another process or node is modifying the file, i.e., the file will have outstanding data in the corresponding write journal. If an identified write journal 119 contains outstanding data to be written to the file, the journaling component 208 creates a physical copy of the write journal 119. The snapshot component 209 creates the snapshot of the file. Further, the snapshot component 209 associates the file with the write journal 119 copy, e.g., by mapping the write journals 119 to the snapshot in a key-value store maintained by the scribe process 214.

Further still, when the snapshot component 209 receives a request to capture a snapshot of a directory, the snapshot component 209 evaluates the files and sub-directories within the directory. The snapshot component 209 does so to identify associated write journals 119 having outstanding data. The snapshot component 209 then copies the write journals. The snapshot component 209 creates a snapshot of the entire directory. The snapshot component 209 then associates the write journal 119 copies with the corresponding files.

Figure 3:
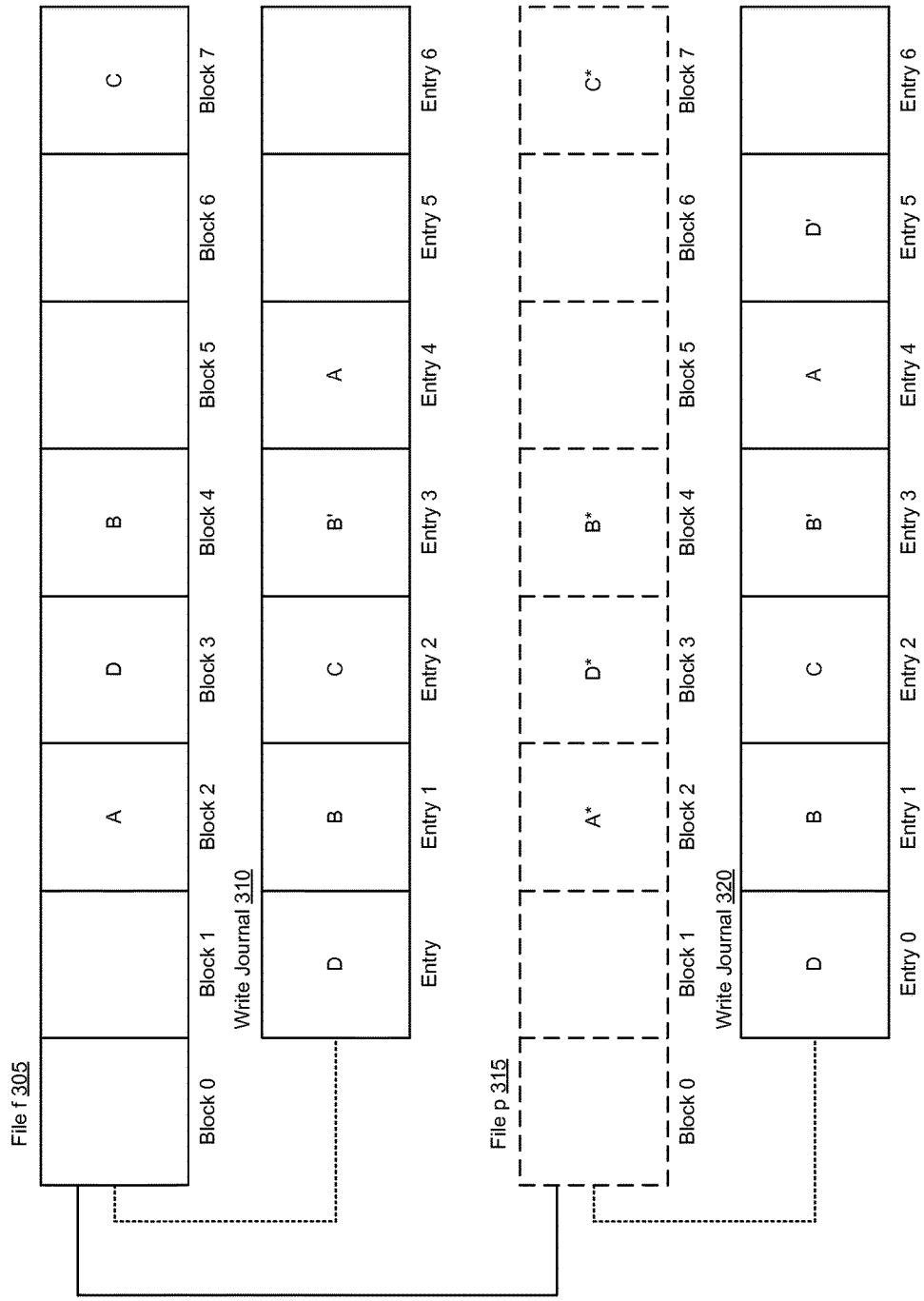
FIG. 3 illustrates an example of a snapshot of a file and corresponding write journal, according to one embodiment.

FIG. 3 illustrates an example of a snapshot of a file f 305 and corresponding write journal 310, according to one embodiment. As shown, the example includes the file f 305, the associated write journal 310, a snapshot file p 315, and a write journal 320 that is associated with the file p 315.

Illustratively, the file f 305 is in sequential block units, numbered from 0-7. FIG. 3 depicts eight block units for the file f 305 for the purposes of simplicity. Of course, a file can include any number of blocks. File f 305 includes data A, B, C, and D written in various blocks of the file f 305. Other unmarked blocks may correspond to other data associated with the file f 305.

The write journal 310 represents sequential changes to the file f 305. As shown, entries of the write journal 310 are numbered from 0-6. Of course, the write journal 310 can include any number of entries modifying data in the file f 305. For example, the entry 0 specifies a change to data D in the file f 305. The journaling component 208 writes to the write journal 310 sequentially. As a result, multiple entries representing changes to the same block of data may appear in the write journal 310. For example, entry 1 specifies a change to data B in the file f 305. Additionally, entry 3 specifies a change to the same data B in the file f 305, depicted as B' in the journal 310. Further, the maintenance component 207 also flushes the write journal 310 sequentially to the file f 305. Doing so ensures that the most recent changes are committed to the disk.

File p 315 represents a snapshot copy of the file f 305 currently presented in FIG. 3. File p 315 includes pointers to the original data in the file f 305. The pointers labels are represented by the original data label with an appended asterisk. For example, A* in the file p 315 corresponds to the data A in the file f 305. As shown, the file p 315 is associated with the journal 320. When the snapshot component 209 creates the file p 315 from file f 305, the journaling component 208 creates the journal 320 as a copy of the journal 310. As a result, the journal 320 includes all of the outstanding entries remaining in the journal 310. In addition, the write journal 320 may include entries corresponding to modifications to the file p 315 (i.e., the snapshot of file f 305). For example, assume data D is modified in file p 315. In this case, the snapshot component 209 adds an entry for the modification in the journal 320 (as shown in entry 5).

Figure 4:
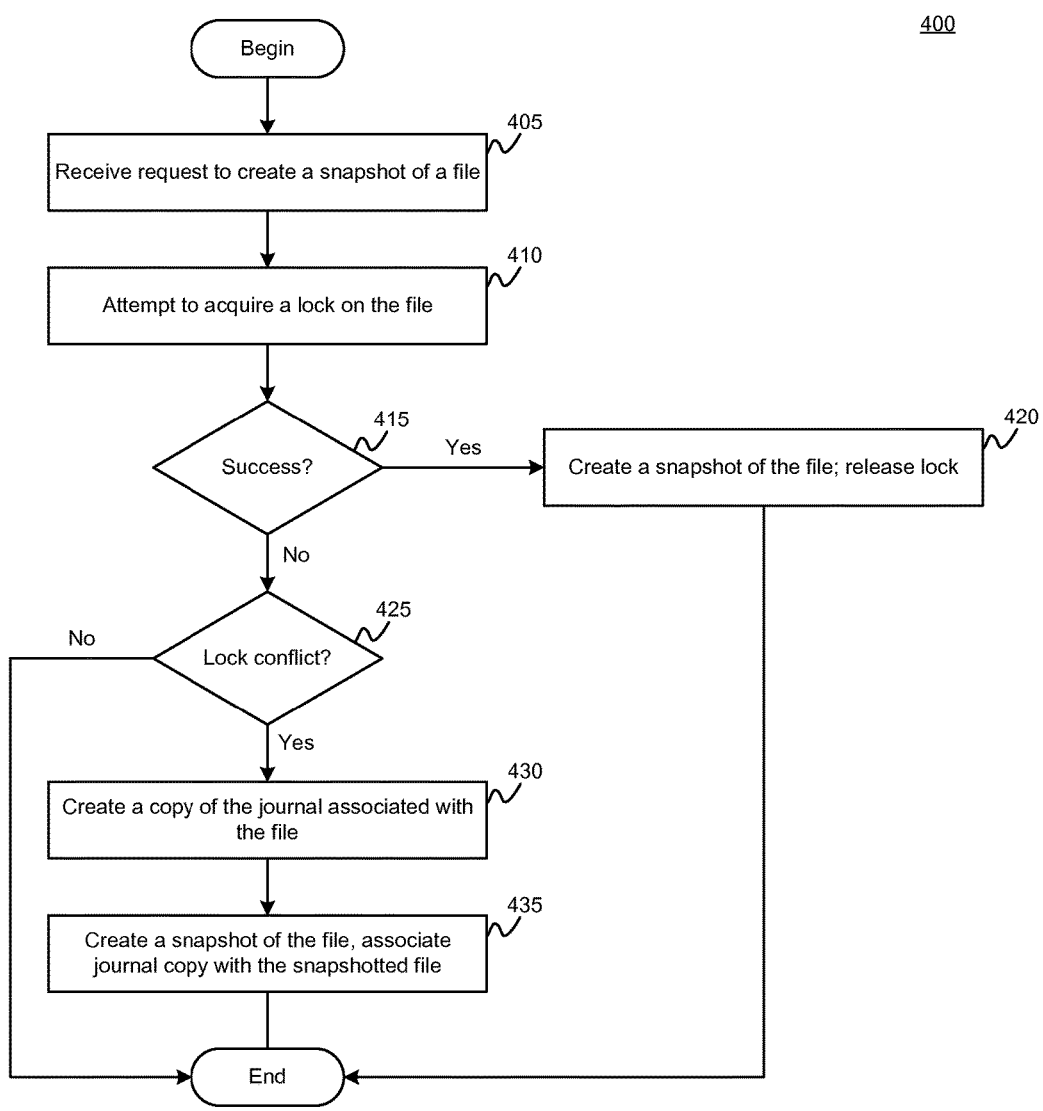
FIG. 4 illustrates a method for performing a snapshot of a file having outstanding data in a write journal, according to one embodiment.

FIG. 4 illustrates a method 400 for performing a snapshot of a file having outstanding data (or metadata) in a write journal, according to one embodiment. As shown, method 400 begins at step 405, where the snapshot component 209 receives a request to capture a snapshot of a file. For example, a client computer 125 may send the request to the distributed file system, and the snapshot component 209 executing locally in one of the secondary storage servers 111 receives the request.

At step 410, the snapshot component 209 attempts to acquire a lock on the file. To do so, the snapshot component 209 requests a lock for the file from the lock service 215. In turn, the lock service 215 determines whether another node or process currently has a lock on the file. If so, then the lock service 215 returns a failure to the service indicating a conflict. If no conflict (or any other issue) exists, then the lock service 215 returns success and provides the snapshot component with the lock on the file.

At step 415, the snapshot component 209 determines whether the attempt to obtain the lock is a success. If successful, then at step 420, the snapshot component 209 creates a snapshot of the file. To do so, the snapshot component creates a file structure that points to the file. The snapshot component 209 releases the lock to the lock service 215.

Otherwise, if unsuccessful, the snapshot component 209 determines whether the failure was due to a conflict. That is, that snapshot component 209 determines whether another node or process has the lock on the file. A conflict indicates that the other node or process may currently be modifying the file, i.e., writing changes to the file on the associated write journal 119. At step 425, the snapshot component 209 determines whether the failure is due to a lock conflict. If not (i.e., the failure is due to some other error), then method 400 ends. Otherwise, the journaling component 208 creates an on-disk copy of the journal (or journals) 119 having outstanding updates to the file. At step 430, the snapshot component 209 creates a snapshot of the file. Further, the journaling component 208 associates the journal 119 copies with the snapshotted file. As stated, the maintenance process 207, at a later time in the background, may flush the outstanding data in the journal 119 copy to the file snapshot.

Figure 5:
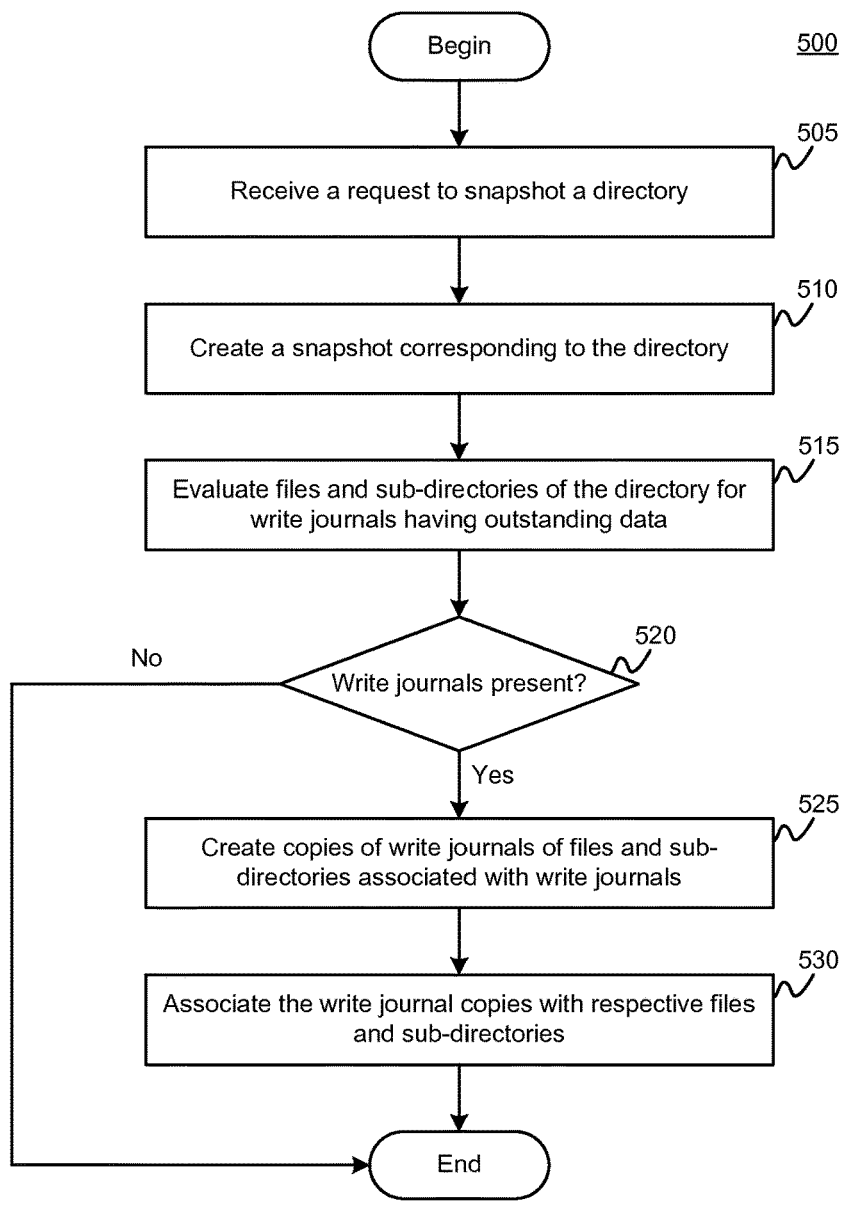
FIG. 5 illustrates a method for performing a snapshot of a file system directory having one or more files and sub-directories each associated with a write journal having outstanding data, according to one embodiment.

FIG. 5 illustrates a method 500 for performing a snapshot of a file system directory having one or more files and sub-directories each associated with a write journal having outstanding data, according to one embodiment. As shown, method 500 begins at step 505, where the snapshot component 209 receives a request to snapshot a directory.

At step 510, the snapshot component 209 creates a snapshot file corresponding to the directory. The snapshot has pointers to blocks of files and sub-directories within the directory. At step 515, the snapshot component 209 evaluates each file and sub-directory for outstanding data (or metadata) recorded in associated write journals. One example of doing so is attempting to obtain locks through the lock service 215 to identify files and sub-directories that currently have a lock in place. At step 520, the snapshot component 515 determines whether any of the associated write journals have outstanding data present. If not, then method 500 ends.

Otherwise, at step 525, the journaling component 208 creates on-disk copies of the associated write journals having outstanding data. Alternatively, the journaling component 208 may create on-disk copies of all write journals associated with the files and sub-directories. In either case, at step 530, the journaling component 208 associates the write journals with the respective files and sub-directories in the directory snapshot. For the write journals having outstanding data, the maintenance process 207 later flushes the write journals to disk.

Figure 6:
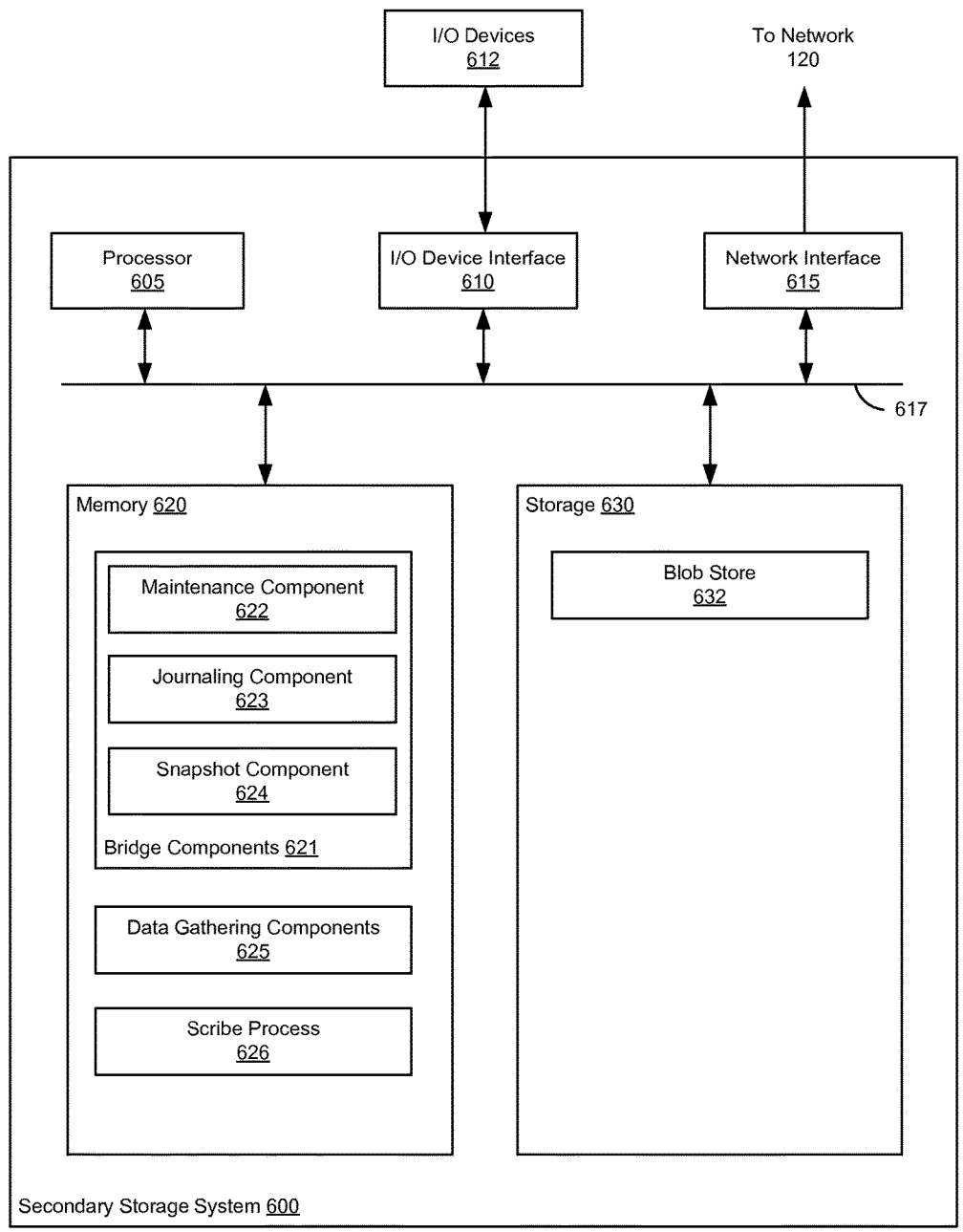
FIG. 6 illustrates an example secondary storage system configured to snapshot operations for file system objects associated with outstanding write journals, according to one embodiment.

FIG. 6 illustrates an example secondary storage system 600 configured to create snapshots of files or directories associated with write journals having outstanding data, according to one embodiment. As shown, secondary storage system 600 includes, without limitation, a central processing unit (CPU) 605, a network interface 615, a memory 620, and storage 630, each connected to a bus 617.

System 600 may also include an I/O device interface 610 connecting I/O devices 612 (e.g., keyboard, display and mouse devices) to the secondary storage system 600. Further, in context of this disclosure, the computing elements shown in secondary storage system 600 may correspond to a physical computing system (e.g., a system in a data center) or may be a virtual computing instance executing within a computing cloud. In one embodiment, the secondary storage system 600 is a node in a distributed secondary storage system cluster. The distributed secondary storage system itself may be composed of multiple clusters.

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes bridge components 621, data gathering components 625, and a scribe process 626. And storage 630 includes a blob store 632. The bridge components 621 provide a file system architecture for the distributed secondary storage system. The data gathering components 625 allow the secondary storage system 600 to communicate with primary storage servers and retrieve data from the primary storage servers.

In one embodiment, the scribe process 626 maintains information about the chunks of data in the blob store 632 in key-value stores (e.g., tree structures). One example key-value store may map blob structures to brick sections. Another store may map bricks to chunks.

In one embodiment, the bridge components 621 include a maintenance component 622, a journaling component 623, and a snapshot component 624. The journaling component 623 maintains write journals associated with file system objects (e.g., files and directories) in the distributed secondary storage system. For example, the journaling component 623 records, in the associated write journal, updates to the files and directories.

In one embodiment, the snapshot component 624 receives requests, e.g., from a client, to create a snapshot of a file or directory. When the snapshot component 624 receives a request (e.g., from the client) to capture a snapshot of a file, the snapshot component 624 determines whether the file has any outstanding blocks of data (e.g., data or metadata changes to the file) in any associated journals (i.e., updates to the file that have not yet been flushed to disk). If so, rather than flush the journals prior to creating the snapshot, the journaling component 623 copies the journals having outstanding data and associates the copies with the snapshot.

The maintenance component 622 includes one or more self-maintenance processes that ensure that the file system remains consistent, e.g., by correcting inconsistencies or updating file system structures after a given process is performed. Further, the maintenance component 622 includes a background process that flushes outstanding data in write journals associated with files or directories to the storage 630.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving a request to capture a snapshot of a file system object, wherein the snapshot is a backup of a state of the file system object in a given point in time;
   requesting from a lock service a lock on the file system object;
   receiving from the lock service a response indicating that the lock is unavailable;
   in response to receiving the response indicating that the lock is unavailable, generating a copy of a write journal, wherein the write journal includes a metadata journal and a data journal, wherein the metadata journal is configured to store one or more changes to a file system associated with the file system object, wherein the data journal is configured to store one or more changes to a file or directory, wherein the write journal includes one or more outstanding updates associated with the metadata journal or the data journal, wherein the copy of the write journal includes the one or more outstanding updates associated with the metadata journal or the data journal, wherein the one or more outstanding updates are updates to the file system object that are received before the request to capture the snapshot;
   capturing the snapshot of the file system object to disk;
   associating the copy of the write journal with the snapshot of the file system object; and
   executing a background maintenance process, wherein executing the background maintenance process includes flushing to disk the one or more outstanding updates included in the copy of the write journal.

2. The method of claim 1, further comprising applying the one or more outstanding updates associated with the metadata journal or the data journal in the copy of the write journal to the snapshot.

3. The method of claim 1, wherein the file system object is a directory having a plurality of files and a plurality of sub-directories.

4. The method of claim 3, further comprising:
generating a copy of each write journal associated with each of the plurality of files and sub-directories within the directory; and
associating the generated copies of each write journal with the snapshot of the directory.

5. The method of claim 1, wherein the write journal captures a plurality of updates to one of at least data associated with a file or metadata associated with the file.

6. The method of claim 1, wherein the file system object is an object of a file system, wherein the file system is a distributed file system, and wherein the write journal is a distributed write journal including at least a first journal and a second journal that maintains updates for the file system object.

7. The method of claim 6, wherein generating a copy of the write journal comprises generating a copy of at least the first journal.

8. The method of claim 1, wherein the one or more outstanding updates associated with the metadata journal or the data journal included in the write journal and the copy of the write journal have a corresponding sequence number.

9. The method of claim 8, wherein the background maintenance process is configured to sequentially flush to disk the one or more outstanding updates associated with the metadata journal or the data journal included in the copy of the write journal.

10. The method of claim 1, further comprising:
receiving one or more write operations associated with the file system object; and
storing the one or more write operations associated with the file system object in the write journal, wherein the one or more write operations associated with the file system object have a corresponding sequence number.

11. The method of claim 1, further comprising determining whether the metadata journal or the data journal are storing any outstanding updates.

12. A non-transitory computer-readable storage medium having instructions, which, when executed on a processor, causes the processor to perform the steps of:
receiving a request to capture a snapshot of a file system object, wherein the snapshot is a backup of a state of the file system object in a given point in time;
requesting from a lock service a lock on the file system object;
receiving from the lock service a response indicating that the lock is unavailable;
in response to receiving the response indicating that the lock is unavailable, generating a copy of a write journal, wherein the write journal includes a metadata journal and a data journal, wherein the metadata journal is configured to store one or more changes to a file system associated with the file system object, wherein the data journal is configured to store one or more changes to a file or directory, wherein the write journal includes one or more outstanding updates associated with the metadata journal or the data journal, wherein the copy of the write journal includes the one or more outstanding updates associated with the metadata journal or the data journal wherein the one or more outstanding updates are updates to the file system object that are received before the request to capture the snapshot;
capturing the snapshot of the file system object to disk; and
associating the copy of the write journal with the snapshot of the file system object; and
executing a background maintenance process, wherein executing the background maintenance process includes flushing to disk the one or more outstanding updates included in the copy of the write journal.

13. The non-transitory computer-readable storage medium of claim 12, wherein the instructions, which, when executed on a processor, further causes the processor to perform the step of applying the one or more outstanding updates associated with the metadata journal or the data journal in the copy of the write journal to the snapshot.

14. The non-transitory computer-readable storage medium of claim 12, wherein the file system object is a directory having a plurality of files and a plurality of sub-directories.

15. The non-transitory computer-readable storage medium of claim 14, wherein the instructions further cause the processor to perform the steps of:
generating a copy of each write journal associated with each of the plurality of files and sub-directories within the directory; and
associating the generated copies of each write journal with the snapshot of the directory.

16. The non-transitory computer-readable storage medium of claim 12, wherein the write journal captures a plurality of updates to one of at least data associated with a file or metadata associated with the file.

17. The non-transitory computer-readable storage medium of claim 12, wherein the file system is a distributed file system, and wherein the write journal is a distributed write journal including at least a first journal and a second journal that maintains updates for the file system object.

18. A system, comprising:
a processor configured to:
receive a request to capture a snapshot of a file system object, wherein the snapshot is a backup of a state of the file system object in a given point in time;
request from a lock service a lock on the file system object;
receive from the lock service a response indicating that the lock is unavailable;
in response to receiving the response indicating that the lock is unavailable, generate a copy of a write journal, wherein the write journal includes a metadata journal and a data journal, wherein the metadata journal is configured to store one or more changes to a file system associated with the file system object, wherein the data journal is configured to store one or more changes to a file or directory, wherein the write journal includes one or more outstanding updates associated with the metadata journal or the data journal, wherein the copy of the write journal includes the one or more outstanding updates associated with the metadata journal or the data journal, wherein the one or more outstanding updates are updates to the file system object that are received before the request to capture the snapshot;
capture the snapshot of the file system object to disk; and
associate the copy of the write journal with the snapshot of the file system object; and
execute a background maintenance process, wherein executing the background maintenance process includes flushing to disk the one or more outstanding updates included in the copy of the write journal; and
a memory coupled to the processor and configured to provide the processor with instructions.

19. The system of claim 18, wherein the processor is further configured to apply the one or more outstanding updates associated with the metadata journal or the data journal in the copy of the write journal to the snapshot.

20. The system of claim 18, wherein the file system object is a directory having a plurality of files and a plurality of sub-directories.

21. The system of claim 20, wherein the processor is further configured to:
- generate a copy of each write journal associated with each of the plurality of files and sub-directories within the directory; and
- associate the generated copies of each write journal with the snapshot of the directory.

* * * * *

UNITED STATES PATENT AND TRADEMARK OFFICE
CERTIFICATE OF CORRECTION

PATENT NO. : 10,339,101 B1
APPLICATION NO. : 14/852332
DATED : July 2, 2019
INVENTOR(S) : Apurv Gupta Page 1 of 1

It is certified that error appears in the above-identified patent and that said Letters Patent is hereby corrected as shown below:

In the Claims

In Column 11, Claim 12, Line 60, after "journal", insert --,--.

Signed and Sealed this
Twenty-fifth Day of February, 2020

Andrei Iancu
*Director of the United States Patent and Trademark Office*